Patented Jan. 16, 1934

1,944,016

UNITED STATES PATENT OFFICE 1,944,016

PROCESS OF PRODUCING OIL SOLUBLE PHENOL-ALDEHYDE CONDENSATION PRODUCTS

Fritz Seebach, Erkner-Berlin, Germany, assignor to Bakelite Gesellschaft mit beschraenkter Haftung, Berlin-Charlottenburg, Germany, a corporation of Germany No Drawing. Original application December 9, 1927, Serial No. 239,008, and in Germany December 14, 1926. Divided and this application November 2, 1928. Serial No. 316,877

6 Claims. (Cl. 260—4)

Phenol-aldehyde condensation products generally are insoluble or difficultly soluble in fatty oils. Suspensions of such products obtained by grinding them in mills with fatty oils are not permanent. Certain purified phenol-aldehyde condensation products obtained by washing the crude products in solid form with bases or by washing solutions of the crude products in organic solvents with bases and then precipitating the products from the washed solutions in the presence of inert fillers are capable of forming stable suspensions in oil. But it is difficult to boil these purified products with oils because very often the solutions thereof first formed decompose and the condensation products are caused to harden.

The process according to my invention for the production of oil-soluble and varnish-soluble phenol-aldehyde condensation products which may also be boiled with oils consists in heating the known insoluble or difficultly soluble phenol-aldehyde condensation products (by "aldehyde" is meant formaldehyde, acetaldehyde, furfural and the like) with phenols containing more than one benzene ring or more than one hydroxyl group, either in the absence or in the presence of catalyzing agents. Compounds which are used in the manufacture of varnish in order to accelerate the drying or the formation of varnish may be employed as catalyzing agents,—as, for instance, hydrated oxide of manganese, or lead oxide, either alone or mixed with each other. Furthermore, compounds of these substances with resins, so-called resinates, may be used, as well as mixtures or compounds of these substances with phenol-aldehyde resins including both Novolak and resols. Also, any kind of oil, for instance, linseed oil, or wood oil, in quantities amounting to 2–10% of the weight of the reaction mass, may be added. Substances having a mild oxidizing effect,—for instance, $\alpha$- $\beta$-nitronaphthalene or nitronaphthol in quantities amounting to about 5–10% or more of the weight of the reaction mass may be added thereto. Air or gaseous oxides of nitrogen, as, for instance, $NO_2$, may also be conducted through the mass.

Among the phenols which are suitable for the production of oil-soluble condensation products according to my invention are, for instance, naphthols ($\alpha$-naphthol, $\beta$-naphthol), diphenols, xanthen, dioxydibenzyl, dicresols, dithymols, dicarvacrols, dinaphthols, and their homologues, and resorcin and its homologues. Molecular compounds of the before-mentioned phenols may also be used, as, for instance, the compound of $\beta$-naphthol and acetamid.

If the process is carried out without the use of catalyzing agents, the phenol-aldehyde condensation products are heated with about one-third to one-half of the phenol until the reaction begins. When employing phenol-formaldehyde condensation products and $\beta$-naphthol, the reaction begins at 120° C. or below, or at 130° C. At the same time the elimination of water takes place, the latter somtimes being noticeable by the evolution of vapors. Generally, spontaneous heating up to about 150–160° C. takes place.

By maintaining the temperature at about 145° C. the mass remains quite liquid. Thereupon generally the temperature is gradually increased to about 250–260° C. The latter temperature is maintained and tests are taken from time to time to see whether there is sufficient solubility in fatty oils, as for instance, linseed oil. Generally the solubility in oil is reached when the condensation products and phenols are heated for a period of 20 minutes. The highest solubility in oil generally is reached after heating the mass 1½ hours. On continuing the heating further the solubility decreases slowly. The resins obtained cannot be hardened. When grinding the resins in oil in the cold the colloidal state is quickly attained so that a product is obtained which can be called a solution. It is sufficient to grind the resin finely and then to mix it with oil. According to the degree of pulverization of the resinous powder a clear solution of the resin in oil is obtained by stirring it for a few minutes or more up to one hour.

The mixture of the resin in oil,—produced either with or without heating,—can be diluted with turpentine spirits or the like and gives easily drying paints. The resins may also be dissolved in varnish (for instance linseed-oil varnish).

If catalyzing agents are employed for the production of compounds of the phenol-aldehyde condensation products with phenols, then the temperature of the reaction mass may be considerably lower and the time of the heating may be considerably shorter. For instance, after the beginning of the reaction the temperature may be maintained constant or may be slightly increased, say by about 10 degrees. When employing catalyzing agents, resins are obtained which can be hardened. They are soluble in oil and varnish in the cold and produce an easily drying paint, and are also soluble in other solvents. The paints may be hardened by heating.

The quantities of the phenol-aldehyde condensation products and the phenols employed may vary. The quantities are determined by testing for the quantity which is sufficient to cause the desired solubility in the oil to be employed.

The products obtained without using a catalyzing agent may be mixed with those obtained by employing a catalyzer either in the cold or by melting them with each other and these mixtures may be boiled with the oil or ground with oil or varnish in the cold.

*Example 1.*—100 kilos of a phenol-aldehyde condensation product capable of hardening are fused with 40 kilos of β-naphthol and, the main reaction being completed, the mass is heated during 1½ hours at 260° C.

*Example 2.*—100 kilos of a phenol-aldehyde condensation product capable of hardening are fused with 40 kilos of β-naphthol and ½% superoxide of manganese, the temperature not increasing more than up to 145° C. After 10-15 minutes the contents of the condensation apparatus are discharged into a flat receptacle.

*Example 3.*—120 kilos of a phenol-aldehyde condensation product capable of hardening, 120 kilos of a phenol-aldehyde condensation product (Novolak) not capable of hardening, 50 kilos of β-naphthol and ½ kilo of hydrated oxide of manganese are heated,—the main reaction being completed,—for 10-15 minutes at 140° C. and then discharged into a receptacle.

*Example 4.*—120 kilos of a phenol-aldehyde condensation product capable of hardening, 120 kg. of a phenol-aldehyde condensation product not capable of hardening (Novolak), 50 kilos of β-naphthol and ½ kilo of hydrated oxide of manganese are maintained, after completion of the main reaction, for 10-15 minutes, at 140° C. by introducing steam at a pressure of 3-4 atm., and then discharged into a receptacle. The resin thus obtained contains hardly any volatile substances, the analysis showing 0.7% volatile substances. After completing the heating vacuum may be applied at the same time conducting a current either of air or of an inert gas, such as carbonic acid, through the mass. The removal of gases from the hot resinous mass is thereby facilitated. By employing inert gases the danger of explosion is avoided.

*Example 5.*—Equal parts of hardened phenol-aldehyde condensation product (in the so-called C-state) and 2.2'-dioxydiphenyl (diphenol) are heated together until the condensation product is dissolved and no more water evaporates. The resulting resin is easily soluble in hot fatty oils.

*Example 6.*—75 kilos of a fusible phenol-aldehyde condensation product capable of hardening (so-called bakelite) are caused to act upon 25 parts of resorcin until the reaction is completed, which is the case as soon as the aqueous vapors cease rising. The resulting resin is easily soluble in cold oils.

*Example 7.*—50 kilos of fusible phenol-aldehyde condensation product capable of hardening are caused to act upon 30 kilos of the molecular compound of β-naphthol and acetamide. The resin thus obtained is soluble in cold fatty oils.

*Example 8.*—The process is carried out according to Example 1, after adding 5% of nitronaphthalene to the reaction mass, the latter thereby being more easily maintained liquid. Instead of adding nitronaphthalene gaseous oxides of nitrogen may also be conducted through the mass.

*Example 9.*—The process is carried out as indicated in Example 2, except that one-half of the quantity of the superoxide of manganese is replaced by the equivalent quantity of lead oxide.

The condensation products capable of hardening used for the process are produced by condensing a phenol (for instance, phenol, cresol, or naphthol) with formaldehyde,—either in a 40% solution, or in the form of paraformaldehyde, in the presence of an alkali, for instance, ammonia, as condensing agent. The condensation products not capable of hardening (Novolak) are produced from phenol and formaldehyde, as catalyzing agent, employing a salt, such as ammonium chloride, or an acid, such as, for instance, muriatic acid.

This application is a division of my application Ser. No. 239,008, filed December 9, 1927 now Patent 1,809,732.

In the appended claims, by the term "metallic driers" I mean metal compound driers which are used in the manufacture of varnish in order to accelerate the drying or the formation of varnish, such as hydrated oxide of manganese or lead oxide, and compounds of such substances with phenol-aldehyde resins including Novolak and resols.

I claim:

1. A process of producing resinous products which are permanently fusible and soluble in a vegetable drying oil which comprises heating a phenol-aldehyde condensation product with a phenol containing more than one hydroxyl group until the reaction mass is soluble in a vegetable drying oil.

2. A process of producing resinous products which are permanently fusible and soluble in a vegetable drying oil which comprises heating a phenol-aldehyde condensation product with a phenol containing more than one hydroxyl group in the presence of a metal compound drier until the reaction mass is soluble in a vegetable drying oil.

3. A process of producing resinous products soluble in a vegetable drying oil which comprises heating a phenol-aldehyde condensation product with a diphenol until the reaction mass is soluble in a vegetable drying oil.

4. A process of producing resinous products which are permanently fusible and soluble in a vegetable drying oil which comprises heating a phenol-aldehyde condensation product with a diphenol in the presence of a metal compound drier until the reaction mass is soluble in a vegetable drying oil.

5. A composition of matter comprising the product obtainable by heating a phenol aldehyde condensation product with a phenol containing more than one hydroxyl group, said composition being a permanently fusible resin soluble in vegetable drying oil.

6. A composition of matter comprising the product obtainable by heating a phenol aldehyde condensation product with a diphenol, said composition being soluble in vegetable drying oil.

FRITZ SEEBACH.